Sept. 28, 1926.  H. REICHEL  1,601,374
ICE CREAM CUTTING MACHINE
Filed Nov. 1, 1923   2 Sheets-Sheet 2
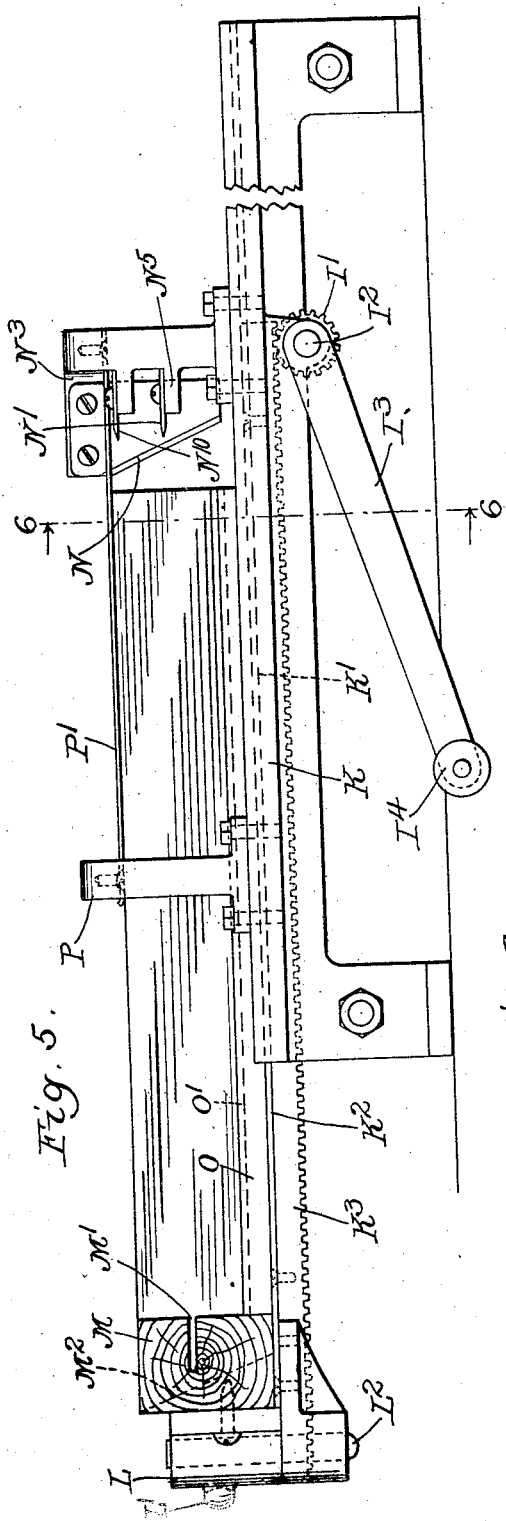
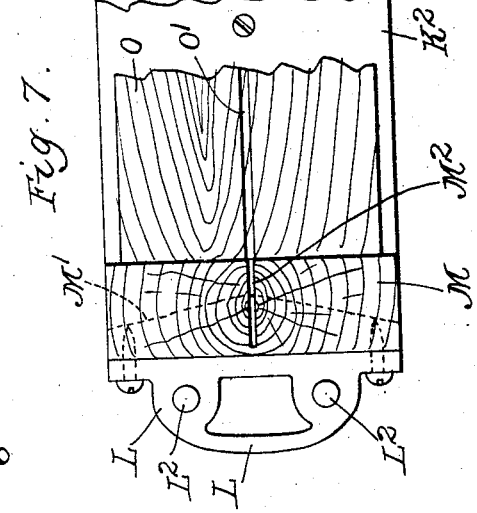
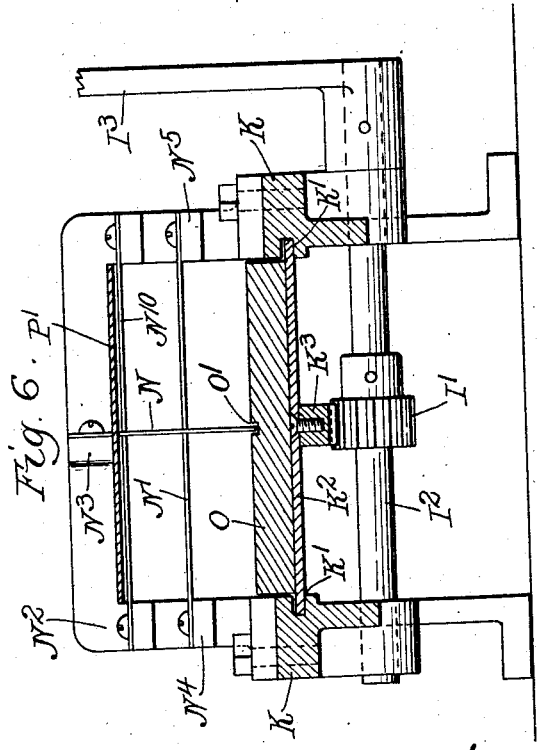
Inventor.
Hugo Reichel.
by Parker + Carter
Attorneys Patented Sept. 28, 1926.

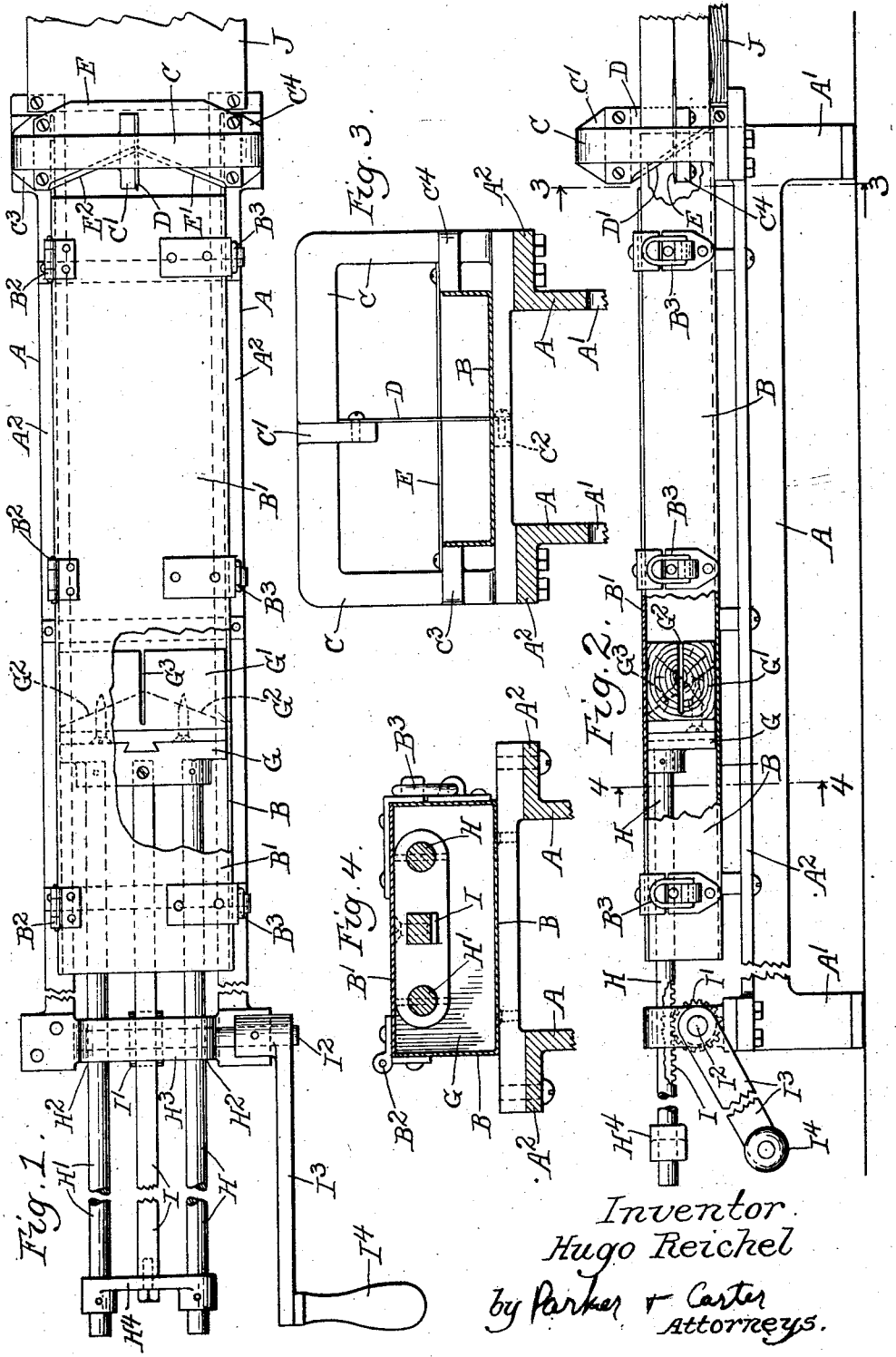

1,601,374

UNITED STATES PATENT OFFICE.

HUGO REICHEL, OF CHICAGO, ILLINOIS.

ICE-CREAM-CUTTING MACHINE.

Application filed November 1, 1923. Serial No. 672,048.

My invention relates to an ice cream cutting machine and particularly to a machine for cutting a slab of ice cream into a plurality of longitudinal sections. One object of my invention is to provide a machine for cutting ice cream slabs into the proper size for the manufacture of chocolate covered ice cream confections. Other objects will appear from time to time in the course of the specification and claims.

I illustrate my invention more or less diagrammatically in the accompanying drawings, wherein—

Figure 1 is a plan view with parts broken away;

Figure 2 is a side elevation with parts broken away;

Figure 3 is a section on the line 3—3 of Figure 2;

Figure 4 is a section on the line 4—4 of Figure 2;

Figure 5 is a side view of a variant form of my device;

Figure 6 is a section on the line 6—6 of Figure 5;

Figure 7 is a detail.

Like parts are illustrated by like characters throughout the specification and drawings.

A is any suitable frame member having, for example, the legs $A^1$ and the working top $A^2$.

Positioned upon the working top $A^2$ is the open ended container B which is provided with a lid $B^1$ hinged along one side as at $B^2$ and provided with locking means $B^3$ along the opposite side.

Upon one end of the working surface $A^2$ is secured the knife frame element C having the knife flanges $C^1$, $C^2$, $C^3$ and $C^4$. Removably secured to the flanges $C^1$ and $C^2$ is the vertical knife D which is provided with a downwardly and rearwardly inclined cutting edge $D^1$.

Intersecting the said knife D and removably secured at its ends to the supporting flanges $C^3$, $C^4$ is the horizontal blade E which is provided with inwardly and rearwardly inclined cutting edges $E^1$, $E^2$ converging at the center of the knife.

G is a plunger plate or casting adapted to fit into the interior of the casing B. Dovetailed or otherwise removably secured to its front is the hard wood plunger plate $G^1$ which is horizontally slotted as at $G^2$ and vertically slotted as at $G^3$ in line with the knives D and E.

Secured in any suitable manner to the rear of the plunger plate G are the plunger rods H, $H^1$ which pass through and are aligned by apertures $H^2$ in the upwardly projecting member $H^3$. The plungers H, $H^1$ are joined at their outer ends by a cross piece $H^4$.

Connecting the cross piece $H^4$ and the plunger plate G and positioned intermediate the plunger rods H and $H^1$ is the rack I which meshes with the pinion $I^1$ on the shaft $I^2$, adapted to be rotated by the crank $I^3$ and handle $I^4$.

J is any suitable receiving board or table, which may be fixed, or may be removable, and which receives the divided slab as it is pressed beyond the knives.

In the variant form shown in Figure 5, the supporting side frame members K are slotted as at $K^1$ to receive a conveying plate $K^2$ on the bottom of which is mounted a rack $K^3$. At the outer end of said plate $K^2$ is mounted a handle piece L provided with a handhold $L^1$. The handle piece L is secured to the plate $K^2$ is by means of vertical pins $L^2$. Secured to said plate or piece L is the hard wood block M which is slotted horizontally at $M^1$ and vertically at $M^2$ to receive the vertical knife N and the horizontal knife $N^1$. The knives are mounted in a knife support $N^2$, the vertical knife N being secured at the top as at $N^3$ but having no support at the bottom. The horizontal knife $N^1$ is secured as at $N^4$ and $N^5$. The two knives are slotted at their intersection. $N^{10}$ is a second similarly mounted transverse knife adjacent the top of the knife supporting frame $N^2$.

Loosely and removably mounted on the plate $K^2$ is the wooden block O which is centrally slotted as at $O^1$ to receive the depending lower edge of the vertical knife, N.

P is a transverse support, secured to the top of which is a shield or lip $P^1$, the opposite end of which is secured to the knife support $N^2$.

It will be realized that while I have shown an operative device nevertheless I do not limit myself to the specific form shown and many changes may be made in the size, shape, number and disposition of parts without departing materially from the spirit of my invention and I wish, therefore, that my drawings be regarded as in a sense diagrammatic.

The use and operation of my invention are as follows:

Ice cream is prevailingly produced in large slabs. It is often desirable to divide these slabs, not into bricks which form cross sections of the slabs, but into bricks or pieces of smaller cross section. One common use for these smaller bricks of ice cream is in the manufacture of various forms of chocolate coated ice cream which are now sold in large quantities. I therefore provide a machine for longitudinally dividing my slab both horizontally and vertically, the knives being positioned in the form of a cross with a horizontal arm intermediate the top and bottom of the slab and a vertical arm intermediate the sides of the slab. The slab is positioned in an open ended aligning box, the crossed knives being positioned at one end of the box, the other end of the box being penetrated by a plunger. The vertical knife is inclined from top to bottom and the horizontal knife is inclined toward its center to provide a shearing action. The slab receiving table or carrier is positioned to the rear of the knives to receive the divided slab as it is thrust through the knives. The plunger is provided with a hard wood face slotted to receive the knives so that the ice cream can be pushed clear of the knives. I show a pair of plunger rods and a rack all secured to the plunger plate at one end and to a cross piece at the other, the plunger rods passing through aligning apertures. I show a hand crank driving a pinion in mesh with the rack, although of course power driven means can be used if so desired. The cross piece H⁴ at the outer end of the plunger rods serves also as a stop to limit the excursion of the plunger.

In the variant form shown in Figures 5, 6 and 7, I place the ice cream on the board O. A rotation of the crank T³ carries the plate K² forward and the board O passes under the knives N and N¹, the slot in the top of the board receiving the lower end of the vertical knife N. The knife N¹ may be inwardly or rearwardly inclined toward its intersection with the vertical knife N. Upon the completion of the cutting excursion the board O with the ice cream upon it lies beyond the knives and the ice cream may be removed from the board or the board and ice cream may be removed as a unit. As in the case of the form earlier shown the vertical and horizontal knives are received in slots in the wood follower block and the ice cream is thus completely clear from the knives at the extremity of the cutting excursion. The lip P¹ serves to position and direct the ice cream slab in its passage through the knives.

I have shown a second horizontal knife positioned to trim or size the top of the slab. While this is illustrated only in Figures 5 and 6, it might also be applied to the form of Figures 1 to 4. Since the thickness of the small bricks cut from the lower tier of the slab is determined by the distance between the surface on which the slab rests and the edge or lower surface of the lower horizontal knife E or N¹, I place the second horizontal knife at a distance above the first horizontal knife equal to the distance between the first horizontal knife and the slab supporting surface. Thus the thickness of the upper tier of pieces is automatically equal to the thickness of the lower. The exact dimensions of these pieces are important, since they are frequently packed by machinery and must bear substantially the same relation to the uniform sized packing sheets which are fed into and handled by the machinery, or else they will not be securely and evenly packed. Also the unevenness on the top of the slab will be trimmed off by these knives.

I claim:

1. In an ice cream cutter, a supporting base, a cross-shaped knife fixed on said base, an ice cream slab guide element aligned with said knife and means for thrusting said slab along said guide and against and past said knife, said knife comprising a vertical and a horizontal blade, the horizontal blade being secured to each side of the base, the vertical blade being secured to the base at the top alone.

2. In an ice cream cutter, a supporting base, a cross-shaped knife fixed on said base, an ice cream slab guide element aligned with said knife and means for thrusting said slab along said guide and against and past said knife, said knife comprising a vertical and a horizontal blade centrally intersecting, the vertical blade being rearwardly inclined in relation to the path of travel of the ice cream and the horizontal blade being inwardly and rearwardly inclined toward its point of intersection with the vertical blade.

3. In an ice cream cutter, a supporting base, a movable ice cream supporting member positioned upon such base and means for moving it longitudinally therealong, a knife support fixed upon said base and overhanging the path of said element, a single centrally disposed cutting means depending therefrom in a vertical plane, positioned along the central axis of such member, and horizontal cutting means positioned along a single horizontal plane intersecting the plane of said first mentioned vertical means.

4. In an ice cream cutter, a supporting base, a movable ice cream supporting member positioned upon such base and means for moving it longitudinally therealong, a knife support fixed upon said base and overhanging the path of said element, a single centrally disposed fixed knife depending therefrom in a vertical plane, positioned along the central axis of such member, and a horizontal fixed knife, positioned in a horizontal plane, intersecting the plane of said first mentioned knife.

5. In an ice cream cutter, a supporting base, a movable ice cream supporting member poistioned upon such base and means for moving it longitudinally therealong, a knife support fixed upon said base and overhanging the path of said element, a single centrally disposed fixed knife depending therefrom in a vertical plane, positioned along the central axis of such member, and a horizontal fixed knife, positioned in a horizontal plane, intersecting the plane of said first mentioned knife, and a supplemental horizontal top terminating blade, the first mentioned horizontal fixed knife being positioned substantially midway between it and the upper surface of the ice cream supporting member.

Signed at Chicago, county of Cook and State of Illinois, this 24th day of October, 1923.

HUGO REICHEL.